United States Patent
Kaechi

(10) Patent No.: US 11,872,956 B2
(45) Date of Patent: Jan. 16, 2024

(54) MONITORING SYSTEM FOR WORKING MACHINE

(71) Applicant: KUBOTA CORPORATION, Osaka (JP)

(72) Inventor: Shuya Kaechi, Osaka (JP)

(73) Assignee: KUBOTA CORPORATION, Osaka (JP)

(*) Notice: Subject to any disclaimer, the term of this patent is extended or adjusted under 35 U.S.C. 154(b) by 714 days.

(21) Appl. No.: 17/063,283

(22) Filed: Oct. 5, 2020

(65) Prior Publication Data
US 2021/0016742 A1    Jan. 21, 2021

Related U.S. Application Data

(63) Continuation of application No. PCT/JP2019/011457, filed on Mar. 19, 2019.

(30) Foreign Application Priority Data

Apr. 10, 2018   (JP) .................................. 2018-075638

(51) Int. Cl.
*B60R 25/33* (2013.01)
*B60R 25/102* (2013.01)
(Continued)

(52) U.S. Cl.
CPC ............ *B60R 25/102* (2013.01); *B60R 25/31* (2013.01); *B60R 25/33* (2013.01); *B64C 39/024* (2013.01);
(Continued)

(58) Field of Classification Search
CPC ....... B60R 25/33; B60R 25/31; B60R 25/102; B60R 2025/1016; B60R 2300/8073;
(Continued)

(56) References Cited

U.S. PATENT DOCUMENTS 10,735,821 B1 *  8/2020  Lewis ................ H04N 21/8545
10,820,034 B2 * 10/2020  Amento ........... H04N 21/41422
(Continued)

FOREIGN PATENT DOCUMENTS

JP    2003-054369 A    2/2003
JP    2014-194604 A   10/2014
(Continued)

OTHER PUBLICATIONS

Diodlo, The internet of things in transport management in South Africa, 2015, IEEE, 1-8 (Year: 2015).*
(Continued)

*Primary Examiner* — McDieunel Marc
(74) *Attorney, Agent, or Firm* — Greenblum & Bernstein, P.L.C.

(57) ABSTRACT

A monitoring system for a working machine includes a boarding detector to detect boarding and alighting of an operator, the boarding detector being provided in the working machine, a position detector to detect a position based on a signal sent from a positioning satellite when the boarding detector detects the alighting of the operator, a transmitter to transmit, to a management machine, positional information representing the position detected by the position detector, and a controller to move the management machine based on the positional information when the boarding detector detects the alighting, the controller being provided in the management machine.

20 Claims, 6 Drawing Sheets

(51) Int. Cl.
*B60R 25/31* (2013.01)
*B64C 39/02* (2023.01)
*B64U 10/10* (2023.01)
*B64U 101/20* (2023.01)

(52) U.S. Cl.
CPC .......... *B64U 10/10* (2023.01); *B64U 2101/20* (2023.01); *B64U 2201/10* (2023.01)

(58) Field of Classification Search
CPC .......... B60R 2325/308; B60R 25/1012; B60R 2325/207; G06Q 50/02; B64U 2101/00; B64U 2201/10; B64U 10/10; B64U 2101/20; G01S 19/16; B64C 39/024; G08B 13/1965
See application file for complete search history.

(56) References Cited

U.S. PATENT DOCUMENTS

| | | | |
|---|---|---|---|
| 2003/0034915 A1 | 2/2003 | Sasaki et al. | |
| 2006/0206246 A1* | 9/2006 | Walker .................. | H04L 63/302 701/16 |
| 2014/0152016 A1* | 6/2014 | Jennings .................. | F03G 7/08 290/55 |
| 2016/0157414 A1 | 6/2016 | Ackerman et al. | |
| 2017/0127606 A1 | 5/2017 | Horton | |

FOREIGN PATENT DOCUMENTS

| | | |
|---|---|---|
| JP | 2014-199514 A | 10/2014 |
| JP | 2017-207815 A | 11/2017 |
| JP | 6263821 B1 | 1/2018 |
| KR | 10-2017-0059893 A | 5/2017 |
| WO | 2012/125726 A1 | 9/2012 |
| WO | 2017/099070 A1 | 6/2017 |

OTHER PUBLICATIONS

Zhuang et al., A Survey of Positioning Systems Using Visible LED Lights, 2018, IEEE, p. 1963-1988 (Year: 2018).*
Mahomood et al., GPS and Remote Sensing for Emergency Vehicle Navigation and Communication, 2006, IEEE, p. 33-36 (Year: 2006).*
Kaihua et al., A novel intelligent transportation monitoring and management system based on GPRS, 2003, IEEE, p. 1654-1659 (Year: 2003).*
Yoshida et al., Automatic Control of Agricultural Machines, 2002, IEEE, p. 267-275 (Year: 2002).*
Garg et al., Crop Productivity based on IoT, 2017, IEEE, p. 223-226 (Year: 2017).*
International Search Report issued in International Application No. PCT/JP2019/011457, dated May 21, 2019 and English Translation thereof.

* cited by examiner

MONITORING SYSTEM FOR WORKING MACHINE

CROSS-REFERENCE TO RELATED APPLICATIONS

The present application is a continuation application of International Application No. PCT/JP2019/011457, filed Mar. 19, 2019, which claims priority to Japanese Patent Application No. 2018/075638, filed Apr. 10, 2018. The contents of these applications are incorporated herein by reference in their entirety.

BACKGROUND OF THE INVENTION

Field of the Invention

The present invention relates to a monitoring system for a working machine.

Description of Related Art

Japanese Unexamined Patent Publication No. 2003-54369 discloses an anti-theft device characterized by including a position detection means for detecting the position of a moving object on the earth, a theft detection means for detecting the theft of the moving object, and a transmission means, and being configured to detect the position of the moving object by the position detection means and transmit the position to a predetermined location by the transmission means after the theft is detected by the theft detection means, the anti-theft device is provided with a position storage means configured to periodically stores the position of the moving object detected by the position detection means when the theft is not detected by the theft detection means, and, the transmission means is configured to transmit the latest position information stored in the position storage means when the theft of the moving object is detected by the theft detection means.

SUMMARY OF THE INVENTION

A monitoring system for a working machine, includes a boarding detector to detect boarding and alighting of an operator, the boarding detector being provided in the working machine, a position detector to detect a position based on a signal sent from a positioning satellite when the boarding detector detects the alighting of the operator, a transmitter to transmit, to a management machine, positional information representing the position detected by the position detector, and a controller to move the management machine based on the positional information when the boarding detector detects the alighting, the controller being provided in the management machine.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
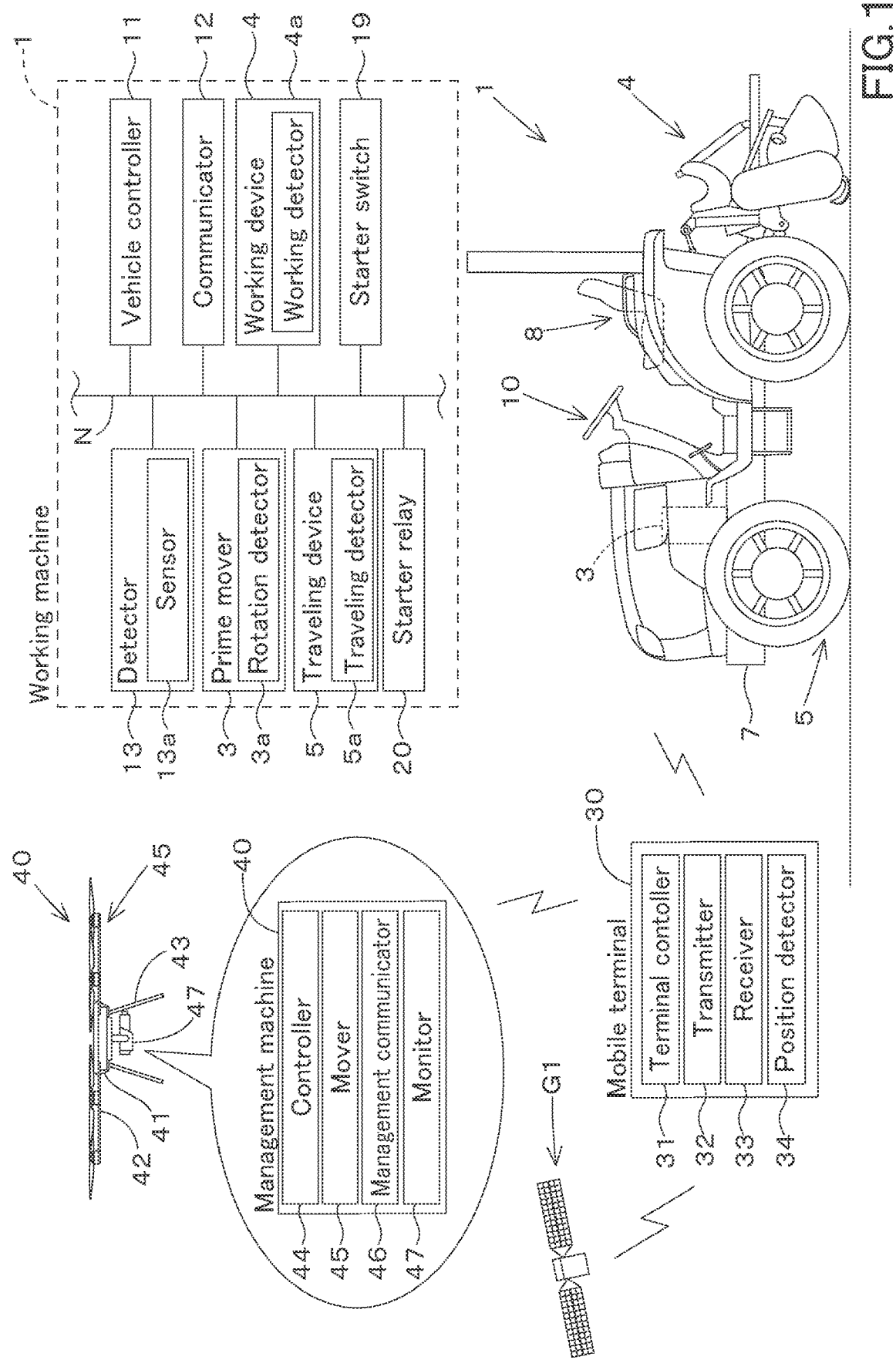
FIG. 1 is an overall view of a monitoring system for a working machine.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with appropriate reference to the drawings.

FIG. 1 is an overall view of a monitoring system for a working machine 1. The monitoring system for the working machine 1 is a system for monitoring the working machine 1. The monitoring system for the working machine 1 can reduce the possibility of the theft of the working machine 1, intrusion of suspicious persons, and the like, by periodically or randomly dispatching a surveillance drone or other management machine 40 to the vicinity of the working machine 1.

The working machine 1 means agricultural machinery and the like which performs work including plowing and harvesting of crops in the field, and the agricultural machinery includes a tractor, a combine, a rice transplanter, and the like. The tractor 1, which is one of the agricultural machinery, will be used as an example for the following description. The tractor 1 can be provided with a working device 4 such as, for example, a cultivator, a mower, a tedder, a rake, and the like.

First, the overall configuration of the tractor 1 will be described below.

As shown in FIG. 1, the tractor 1 is provided with a traveling vehicle (traveling vehicle body) 7 having a traveling device 5, and a prime mover (driving portion) 3, such as a diesel engine.

The tractor 1 is provided with a vehicle controller (vehicle controller device) 11 and a communicator (communicator device) 12. The tractor 1 is also provided with a speed detector (speed detector portion) 3a, a working detector (working detector portion) 4a, a traveling detector (traveling detector portion) 5a, a starter switch 19, and a starter relay 20. The prime mover 3, the working device 4, the traveling device 5, the vehicle controller 11, the communicator 12, the boarding detector (boarding detector device) 13, the rotating-speed detector 3a, the working detector 4a, the traveling detector 5a, the starter switch 19, and the starter relay 20 are connected by an on-board network N such as CAN.

In other words, the devices connected by the on-board network N, including the prime mover 3, the working device 4, and the traveling device 5, can output and acquire information among the devices on the on-board network N. For example, the vehicle controller 11 can obtain the number of revolutions of the prime mover 3 from the rotating-speed detector 3a.

The vehicle control device 11 can also obtain the vehicle speed of the traveling device 5 from the traveling detector 5a. The vehicle controller 11 can also acquire information such as the operating state of the working device 4 from the working detector 4a. In particular, the rotating-speed detector 3a is a device that detects the number of revolutions of the prime mover 3.

In other words, the rotating-speed detector 3a can detect whether the prime mover 3 is starting or not. The rotating-speed detector 3a is provided in the prime mover 3 and includes a sensor or the like that detects the number of revolutions of the prime mover 3. The rotating-speed detector 3a can be any type of sensor as long as it is capable of detecting whether the prime mover 3 is starting or not.

The rotating-speed detector 3a can output a signal based on the number of revolutions detected by the rotating-speed detector 3a to the vehicle controller 11 via the on-board network N. In other words, the vehicle controller 11 can obtain the number of revolutions of the prime mover 3 from the rotating-speed detector 3a.

The working detector 4a is a device for detecting a state of an actuator and the like provided in the working device 4. In detail, the working detector 4a detects, for example, the number of rotations of the actuator provided in the working device 4, the rotational speed of the actuator, and the like. In other words, the working detector 4a can detect whether the working device 4 is operating or not.

The working detector 4a is provided in the working device 4 and includes a sensor or the like that detects the number of rotations of the actuator, the rotational speed of the actuator, and the like. The working detector 4a can be any type of working detector 4a that can detect whether the working device 4 is operating or not. The working detector 4a can output a signal based on the information detected by the working detector 4a to the vehicle controller 11 via the on-board network N.

The working detector 4a can also output a signal based on the information detected by the working detector 4a to the vehicle controller 11. In other words, the vehicle controller 11 can obtain the status of the working device 4 from the working detector 4a.

The traveling detector 5a is a device that detects the traveling speed (ground speed) of the working machine 1, that is, the speed of the traveling device 5. In other words, the traveling detector 5a can detect whether the traveling device 5 is operating or not.

The traveling detector 5a is provided in the traveling device 5 and includes a speed sensor or the like that detects the vehicle speed of the working machine 1. The traveling detector 5a can be any type of device that is capable of detecting whether the traveling device 5 is operating or not.

The vehicle controller 11 includes a CPU or the like and performs various controls relating to the working machine 1.

The communicator 12 is a device that communicates, for example, with the transmitter 32 and receiver 33 provided in the mobile terminal 30. The communicator 12 is a device that communicates over a short or long distance.

For example, the communicator 12 performs the wireless communication with the receiver 33 in a wireless fidelity (wireless fidelity, a registered trademark) in the IEEE802.11 series of communication standards, Bluetooth (a registered trademark) Low Energy in the specifications of the Bluetooth (registered trademark) in the IEEE802.15.1 series of communication standards, and the like.

The starter switch 19 is a switch for starting the prime mover 3. When an operator inserts an engine key into a key cylinder provided around the operator seat and turns the engine key, the starter switch 19 outputs a signal to the starter relay 20 to start the prime mover.

The starter relay 20 is a component for starting the prime mover 3. When a signal for starting the prime mover is input from the starter switch 19 to the starter relay 20, the starter relay 20 starts the prime mover 3.

The starting of the prime mover, which is one of the prime mover drives, is not limited to a mechanical type (key cylinder type) where the engine key is inserted into the key cylinder and the starter relay 20 is turned on, but may be a smart entry type where the starting of the prime mover is permitted or prohibited by radio communication.

The mobile terminal 30 includes, for example, a PC or a smartphone (multifunctional mobile phone) with relatively high computing power. The mobile terminal 30 includes a terminal controller (terminal controller device) 31, a transmitter (transmitter portion) 32, a receiver (receiver portion) 33, a position detector (position detector device) 34.

The terminal controller 31 includes a CPU or the like and performs various controls relating to the mobile terminal 30. The transmitter 32 transmits position information detected by the position detector 34 to the working machine 1, the management machine 40 and the like.

The transmitter 32 carries out wireless communication with the working machine 1, the management machine 40, and the like by, for example, Wi-Fi (registered trademark). The transmitter 32 may also communicate wirelessly with the working machine 1, the management machine 40, and the like by means of a data communication network, a cellular phone communication network, Bluetooth (registered trademark) Low Energy, or the like.

The receiver 33 receives signals from the communicator 12. The receiver 33 carries out wireless communication with the working machine 1, the management machine 40 and the like by, for example, Wi-Fi (registered trademark) or the like. The receiver 33 may also perform wireless communication with the working machine 1, the management machine 40, and the like by means of a data communication network, a cellular phone communication network, Bluetooth (registered trademark) Low Energy, and the like.

The position detector 34 is a device that detects its own position (positioning information) by a satellite positioning system. The position detector 34 receives a signal transmitted from the positioning satellite G1 and detects its own position (for example, latitude and longitude) based on the received signal.

In other words, an operator working in the field can detect the position of the working machine 1 by having the mobile terminal 30 in his or her possession at the time of work. This allows the monitoring system for the working machine 1 to use the mobile terminal 30, which is pre-installed with the position detector 34. Thus, the monitoring system for the working machine 1 can be easily introduced even if the working machine 1 does not have a position detector 34.

The mobile terminal 30 can also communicate with the server 50 by means of a data communication network or a cellular phone communication network. Thus, even if the communicator 12 provided in the working machine 1 supports only short-range communication, the working machine 1 can communicate with the server 50 via the mobile terminal 30. In other words, the server 50 can call the management machine 40.

As shown in FIG. 1, the management machine 40 is a rotor craft capable of flying unmanned by a plurality of rotor blades 45, for example, a flying vehicle called a multicopter (drone). In other words, the management machine 40 is a multicopter capable of flying over a field. This allows the management machine 40 to be easily dispatched even when it is difficult to move over the ground, such as when the surface of the field on which the working machine 1 is working is rough.

As a result, the management machine 40 can be dispatched regardless of the condition of the field, and the possibility of the theft of the working machine 1 can be reduced in advance. The management machine 40 is capable of flying by autonomous control without relying on a remote device. The management machine 40 may not be a flying machine, but may have a mobile means such as a crawler that moves on the ground.

In other words, since the management machine 40 is used to monitor the working machine 1, there is no need to install a device for monitoring the working machine 1 itself. Thus, in the future, the management machine 40 with improved monitoring capability, that is, a monitoring system with high monitoring capability, can be easily introduced.

The management machine 40 has a main body 41, an arm 42, a rotor blade 45 and a skid 43.

As shown in FIG. 1, a plurality of arms 42 are attached to the main body 41. In the case of the present embodiment, six arms 42 are attached to the main body 41; the six arms 42 extend radially from the center of the main body 41 in a horizontal plane (a plane parallel to the ground in a landing state).

However, the number of arms 42 is not limited to six, but may be seven or more, or five or less. The arm 42 may be foldable toward the main body 41. The base end side of the arms 42 is attached to the main body 41. Each of the plurality of arms 42 has a rotator blade 45 attached to the tip side of the plurality of arms 42.

The rotor blades 45 generate lift force for the management machine 40 to fly. The rotor blade 45 includes a rotor and a blade (propeller). The rotor includes an electric motor (such as a DC motor). The rotor is driven by power supplied from a battery. A blade is attached to the upper part of the rotor's axis of rotation. The adjacent rotating blades 45 rotate in opposite directions to each other.

The number of rotor blades 45 is not limited and can be changed according to the required lift and other requirements. For example, the management machine 40 may be a tricopter having three rotor blades 45, a quadcopter having four rotor blades 45, a hexacopter having six rotor blades 45, or an octocopter having eight rotor blades 45. In the following description, the rotor blades 45 may also be referred to as the moving portion 45.

The skid 43 is installed when the management machine 40 lands and supports the main body 41 on the ground.

The management machine 40 also has a controller device 44, the moving portion 45, a management communicator 46, and a monitor 47.

The controller device 44 includes a CPU and the like and performs various controls relating to the management machine 40. In particular, for example, the controller device 44 controls the moving portion 45.

The management communicator 46 is a device by which the management machine 40 communicates wirelessly with the transmitter 32 provided in the mobile terminal 30, the outside, and the like.

The monitor portion (monitor device) 47 is a device for monitoring and monitoring a suspicious person approaching a worker or for reducing the possibility of theft or the like. In particular, it is a camera that captures images of the intruders and the like. The camera for capturing the intruders and the like can be a camera that takes still images, a video camera that takes moving images, or a similar type of camera.

The image or video captured by the monitor 47 is transmitted from the management communicator 46 to the mobile terminal 30 or to the outside. The monitor portion 47 may also be provided with a warning portion. The warning portion is an alarm that warns by means of a warning sound when, for example, the management machine 40 detects a suspicious person or theft of the working machine 1.

The warning portion is not limited to an alarm that warns with a warning sound, but may also be one that warns with a light. The monitor portion 47 can be anything that can reduce the possibility of the theft or the like of the working machine 1, as long as it can reduce the possibility of the theft or the like of the working machine 1 before it occurs, and it can be anything that prevents the theft. For example, the monitor portion 47 may be a dummy camera or the like disguised as a camera.

Now, the vehicle controller 11 can be switched between a normal mode and a monitoring mode. The normal mode is a mode in which the operator boards the working machine 1 and performs the working in the field. On the other hand, the monitoring mode is a mode for monitoring the working machine 1 when the operator is not on board the working machine 1 and the working machine 1 is stopped.

In detail, the normal mode and the monitoring mode are switched between the normal mode and the monitoring mode by means of a switching member installed around the operator seat of the working machine 1. The switching material is, for example, a switch such as a seesaw type switch or a push button switch. The vehicle controller 11 switches between a normal mode and a monitoring mode based on a switching signal, which is a signal input from the switching member.

The vehicle controller 11 also determines whether the prime mover 3 of the working machine 1 is operating or not. In detail, the vehicle controller 11 determines whether the prime mover 3 of the working machine 1 is operating based on a signal input from the starter switch 19. The vehicle controller 11 may determine whether the prime mover 3 of the working machine 1 is operating based on a signal input from the rotating-speed detector 3a.

The tractor 1 is provided with the boarding detector 13. The boarding detector 13 is a device for detecting the boarding and alighting of an operator on the working machine 1. In particular, the boarding detector 13 detects an operator's boarding and alighting of the operator on the working machine 1 based on a signal output from the detection sensor.

The detection sensor has a sensor 13a, such as a pressure sensor, a strain sensor, or the like, installed in the seat of the operator seat 8 of the working machine 1. The sensor 13a detects a load with respect to the seat of the operator seat 8 of the working machine 1. In detail, the presence or absence of an operator on the operator seat is detected by a signal output from the sensors 13a when an operator is seated in the operator seat 8 of the working machine 1 and when the operator is not seated in the operator seat 8.

In this embodiment, the detection sensors include the sensor 13a, the rotating-speed detector 3a, the working detector 4a, and the traveling detector 5a. In other words, the boarding detector 13 detects the boarding and alighting of the operator depending on whether the operator is seated in the operator seat 8 and whether the prime mover 3, the working device 4, and the traveling device 5 are operating.

The signals output from the rotating-speed detector 3a, the working detector 4a, and the traveling detector 5a are output to the boarding detector 13 via the on-board network N. The signal output from the boarding detector 13 is output to the communicator 12. The boarding detector 13 is not limited to the above configuration, and can be any device that can detect an operator's boarding and alighting to the working machine 1.

For example, the boarding detector 13 may detect a change in load on the traveling vehicle body of the working machine 1 to detect the operator's boarding and alighting of the operator on the working machine 1. The detection sensor may include only at least one of the sensors 13a, such as the rotating-speed detector 3a, the working detector 4a, a traveling detector 5a, a pressure sensor, and the like. In this case, the boarding detector 13 detects an operator's boarding and alighting of the operator on the working machine 1 based on a signal output from at least one of the sensors 13a, such as the rotating-speed detector 3a, the working detector 4a, the traveling detector 5a, the pressure sensor, and the like.

In particular, when the rotating-speed detector 3a detects the operation of the prime mover 3, it is determined that the operator is riding. When the operation detection unit 4a detects the operation of the working device 4, it is judged that the operator is in the vehicle. If the traveling detector 5a detects the movement of the driving device, it is assumed that the operator is in the vehicle.

If the sensor 13a detects that the operator is seated in the operator seat 8, it is determined that the operator is in the vehicle. That is, if a signal output from one of the sensors 13a, such as the rotating-speed detector 3a, the working detector 4a, the traveling detector 5a, the pressure sensor, or the like, indicates that the operator is in the cab, the passenger detection unit 13 detects that the operator is in the cab.

On the other hand, if the speed detection section 3a detects the stop of the prime mover 3, the working detector 4a detects the stop of the working device 4, the traveling detector 5a detects the stop of the travel device, and the sensor 13a detects that the operator is not seated in the operator seat 8, the boarding detector 13 detects the operator's alighting.

The communicator 12 transmits to the receiver 33, for example, a boarding signal indicating a boarding and a alighting signal indicating a boarding signal and an alighting signal indicating a boarding of the operator to the working machine 1 detected by the boarding detector 13.

In particular, when the boarding detector 13 detects an operator boarding the working machine 1, the communicator 12 obtains a boarding signal from the boarding detector 13. The communicator 12 transmits the boarding signal to the receiver 33. On the other hand, when the boarding detector 13 detects the operator's alighting from the working machine 1, the communicator 12 obtains a alighting signal from the boarding detector 13.

The communicator 12 transmits the alighting signal to the receiver 33. The communicator 12 also transmits a parking signal to the receiver 33, which notifies the receiver 33 that the working machine 1 has stopped. When the prime mover 3 stops, the vehicle controller 11 determines that the working machine 1 has stopped after a predetermined time has elapsed and sends a parking signal. This allows the monitoring to be started in conjunction with the operator's alighting from the working machine 1.

As a result, it is possible to reduce unprotected conditions such as stopping the working machine 1 and not being monitored even though the operator is not on board the working machine 1, or wasteful conditions such as monitoring even though the operator is on board the working machine 1 and the working is in progress. It is also possible to determine the operator's alighting based on the fact that the operator has completed the work and stopped the prime mover 3, the working device 4, and the traveling device 5 of the working machine 1.

For this reason, the system can determine the operator's alighting in a configuration that is also provided in the conventional work machine 1. In other words, it is easy to introduce a monitoring system for working machine 1. The system can also detect the seating of the operator in the seat of the operator seat 8 provided in the working machine 1. Thus, the presence or absence of an operator in the operator seat 8 of the working machine 1 can be easily determined. In other words, the accuracy of detecting the alighting and boarding of the operator can be improved.

The terminal controller 31 can be switched between a normal mode and a monitoring mode. The normal mode is a mode for using normal PC and smartphone functions. The monitoring mode is a mode for calling the management machine 40 at regular intervals or randomly around the working machine.

The switching between the normal mode and the monitoring mode is switched based on a terminal change signal received by the receiver 33. In particular, when the receiver 33 receives a terminal change signal, the mode is switched to either the normal mode or the monitoring mode based on the terminal change signal. If the receiver 33 does not receive the terminal change signal, the current mode is maintained.

The transmitter 32 transmits, for example, a call signal to the management machine 40. The call signal is a signal that includes positional information and a statement that the machine is to be dispatched to a position corresponding to the positional information. In other words, the call signal is a signal for calling the management machine 40 to the vicinity of the work machine.

The transmitter 32 transmits the call signal to the management machine 40 at predetermined time intervals or at random time intervals. This eliminates the need to have the management machine 40 always on standby in the vicinity of the working machine. It also reduces the possibility that the management machine 40 will be dispatched and the time interval to be monitored is known.

In other words, the possibility that the management machine 40 is not dispatched in the vicinity of the working machine and that the working machine 1 is targeted during the interval of monitoring can be reduced.

The receiver 33 receives, for example, a parking signal and a boarding signal. The received stop and boarding signals are output to the terminal controller 31.

The controller device 44 moves the management machine 40 based on the call signal received by the management communicator 46. In detail, the call signals are transmitted from the transmitter 32 when the terminal controller 31 of the mobile terminal 30 is in the monitoring mode.

The terminal controller 31 is in the monitoring mode when the vehicle controller 11 of the working machine 1 is in the monitoring mode, for example, when the boarding detector 13 detects an operator's alighting. In other words, the controller device 44 can move the management machine 40 to the relevant position based on the position information detected by the position detector 34 when the boarding detector 13 detects an operator's alighting.

The management communicator 46 receives a call signal from the transmitter 32. The management communicator 46 performs wireless communication with the transmitter 32 and the outside and the like by means of Wi-Fi (registered trademark) and the like.

The management communicator 46 receives signals from the transmitter 32 and the outside world, for example, by means of a cellular phone communication network, a data communication network, a cellular phone communication network, or the like.

The management communicator 46 receives, for example, a call signal from the transmitter 32 or the outside world. The call signal received by the management communicator 46 is output to the controller device 44.

Figure 2:
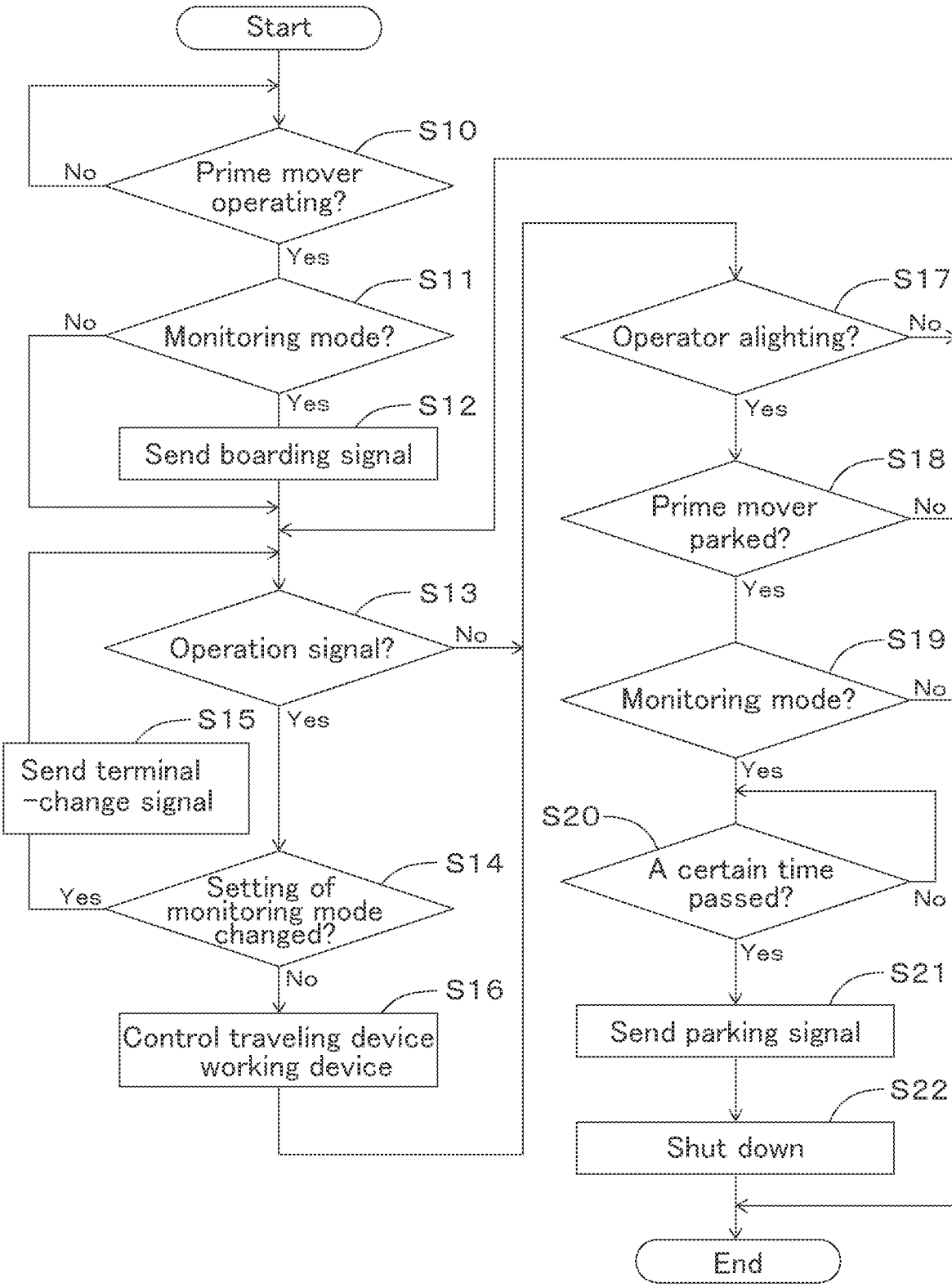
FIG. 2 is a view showing a sequential flow of the monitoring system in the working machine.

A series of operations of the monitoring system in the working machine 1 will be described below, with reference to FIG. 2.

The vehicle controller 11 determines whether the prime mover 3 of the working machine 1 is operating (step S10). In detail, the vehicle controller 11 determines whether the prime mover 3 of the working machine 1 is started or not based on a signal input from the starter switch 19.

If the vehicle controller 11 determines that the prime mover 3 is operating, the vehicle controller 11 confirms whether the vehicle controller 11 is in the normal mode or the monitoring mode (step S11).

When the vehicle controller 11 is in the monitoring mode, the communicator 12 transmits a boarding signal to the receiver 33 of the mobile terminal 30 (step S2).

The vehicle controller 11 checks whether the operation signal is output from the operation member 10 provided around the operator seat to the vehicle controller 11 (step S13). In other words, the vehicle controller 11 confirms whether the operation member 10 is being operated.

When the vehicle controller 11 confirms that an operation signal is output from the operation member 10 to the vehicle controller 11, the vehicle controller 11 confirms whether there is a change in the mode setting of the vehicle controller 11 (step S4).

In particular described, the vehicle controller 11 confirms whether there is a change from one of the normal mode or the monitoring mode to the other. In detail, the signal output from the switching section material is acquired. In other words, the vehicle controller 11 determines that there is a change in the setting when the switching signal is output from the switching component material to the vehicle controller 11.

On the other hand, the vehicle controller 11 determines that there is no setting change if no switching signal is output from the switching component to the vehicle controller 11.

When the vehicle controller 11 confirms that there is a setting change from either the normal mode or the monitoring mode, the vehicle controller 11 sends a terminal change signal (step S15). In particular, in this case, the communicator 12 transmits the terminal change signal to the receiver 33 of the mobile terminal 30.

On the other hand, if the vehicle controller 11 determines that there is no change in the setting from either the normal mode or the monitoring mode, the vehicle controller 11 controls the working device 4 and the traveling device 5 based on the operation of the operation member 10 (step S16). In particular, the vehicle controller 11 controls the working device 4 and the traveling device 5 based on the signal input to the vehicle controller 11 from the operation member 10.

The boarding detector 13 checks whether the operator is alighting (step S17). In particular, if a signal output from one of the sensors 13a, such as the rotating-speed detector 3a, the working detector 4a, the traveling detector 5a, the pressure sensor, or the like, indicates that the operator is on board, the boarding detector 13 detects that the operator is on board.

On the other hand, the boarding detector 13 detects the operator's alighting when either the prime mover 3 is stopped, the working device 4 is stopped, the traveling device is stopped, or the operator is not seated.

The vehicle controller 11 determines whether the prime mover 3 of the working machine 1 is not operating (step S18). In detail, the vehicle controller 11 determines whether or not the prime mover 3 of the working machine 1 has been started based on the signal input from the starter switch 19.

If the vehicle controller 11 determines that the prime mover 3 of the working machine 1 is not operating, the vehicle controller 11 confirms whether the vehicle controller 11 is in the normal mode or the monitoring mode (step S19).

After a predetermined time (step S20), the communicator 12 transmits a parking signal to the receiver 33 of the mobile terminal 30 (step S21).

After sending the parking signal, the working machine 1 shuts down (step S22). In other words, the system inside the working machine 1, including the vehicle controller 11 of the working machine 1, is shut down.

Figure 3:
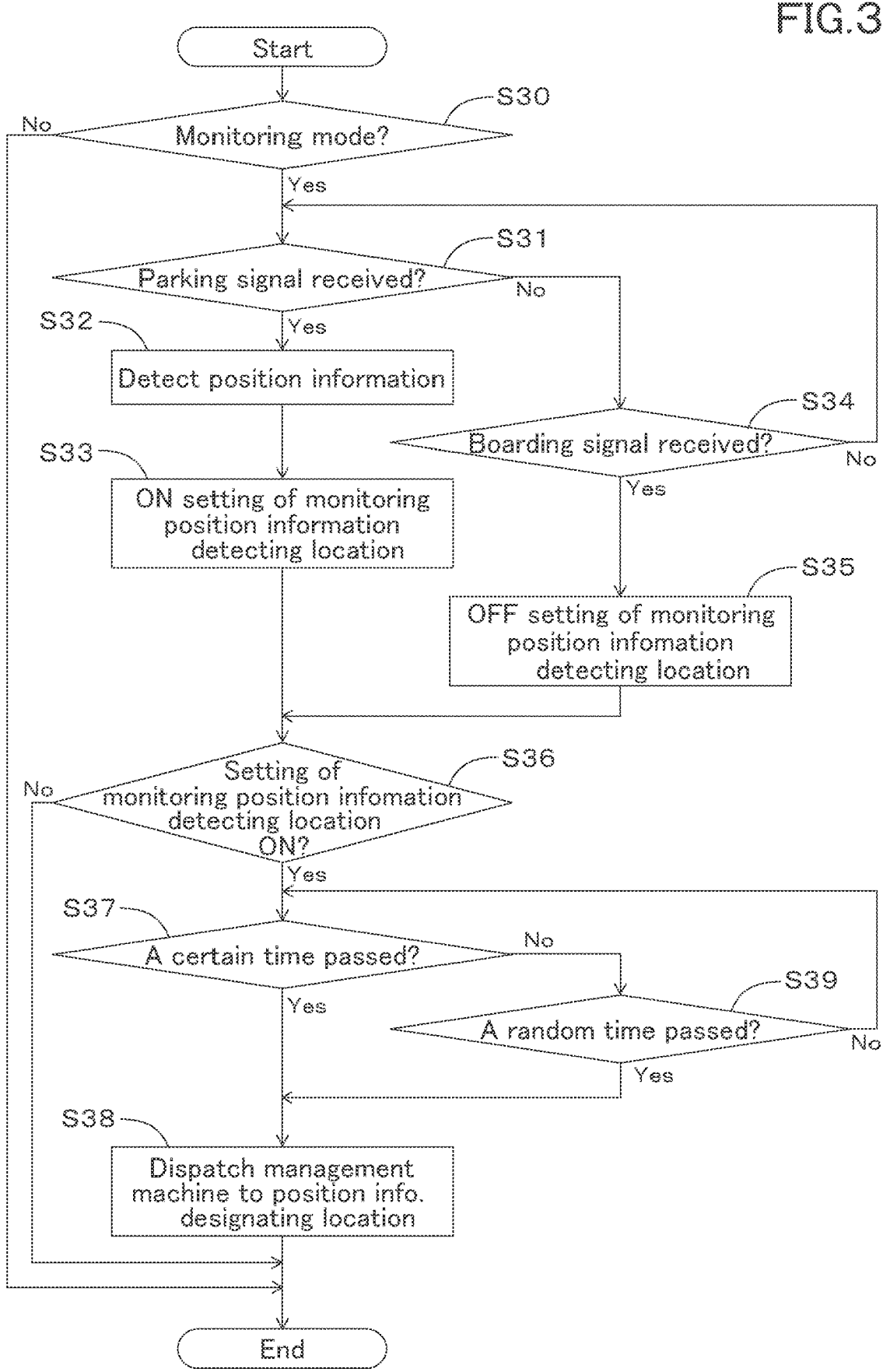
FIG. 3 is a view showing a sequential flow of the monitoring system in a mobile terminal.

A series of operations of the monitoring system at the mobile terminal 30 will be described below, with reference to FIG. 3.

The terminal control device 31 determines whether or not it is in the monitoring mode (step S30). In particular, the terminal controller 31 checks whether the receiver 33 receives a terminal change signal.

If a terminal change signal is received, the terminal controller 31 determines that the terminal controller 31 has been changed from one of the normal mode and the monitoring mode to the other. If the terminal change signal is not received, the terminal controller 31 maintains the current mode.

If it is determined to be in the monitoring mode, the terminal controller 31 confirms whether the receiver 33 is receiving the parking signal (step S31).

If it is confirmed that the parking signal is being received, the boarding detector device 13 detects the positional information (step S32).

In particular, the position detector 34 receives the signal transmitted from the positioning satellite G1 and detects its own position based on the received signal. In other words, the position detector 34 detects the position of the operator at the time of boarding or alighting from the working machine 1.

The terminal control device 31 sets up monitoring by the management machine 40 for the position detected by the boarding detector 13 (step S33).

On the other hand, if the parking signal is not received, the terminal controller 31 checks whether the receiver 33 receives the boarding signal (step S34).

If it is determined that the boarding signal is being received, the terminal controller 31 releases the monitoring at the position detected by the positional information detector (step S35). In detail, the terminal controller 31 releases the setting of the monitoring when the monitoring is set for the position. On the other hand, the terminal controller 31 does not set the monitoring for the position if the monitoring is not set for the position.

It checks whether monitoring is set for the location where the positional information is detected (step S36).

After a certain amount of time has passed (step S37), the mobile terminal 30 dispatches the management machine 40 about the location where the positional information was detected (step S38). In particular, the transmitter 32 of the mobile terminal 30 transmits a call signal including the positional information detected by the position detector device 34 to the management machine 40.

In this manner, based on the call signal, the management machine 40 moves to the position. In other words, the mobile terminal 30 dispatches the management machine 40 to the vicinity of the work machine at regular intervals.

Even before a certain amount of time has elapsed (step S37), if a random amount of time has elapsed (step S39), the management machine 40 is dispatched to the location where the position detector device 34 has detected the positional information (step S38).

In particular, the transmitter 32 of the mobile terminal 30 transmits a call signal including the positional information detected by the position detector device 34 to the management machine 40. Thereby, based on the call signal, the management machine 40 moves to the position. In other words, the mobile terminal 30 dispatches the management machine 40 to the vicinity of the work machine at random time intervals.

The monitoring system for the working machine 1 according to one aspect of the present invention is provided with a boarding detector 13, a position detector 34, a communicator 12, and a control device 44. This allows the monitoring to be initiated in conjunction with the operator's alighting from the working machine 1.

As a result, it is possible to reduce unprotected conditions such as stopping the working machine 1 and not being monitored even though the operator is not on board the working machine 1, or wasteful conditions such as monitoring even though the operator is on board the working machine 1 and the work is in progress.

In addition, since the management machine 40 is used to monitor the working machine 1, there is no need to install a device for monitoring the working machine 1 itself. Thus, in the future, a management machine 40 with improved monitoring capability, that is, a monitoring system with high monitoring capability, can be easily introduced.

The working machine 1 is provided with a detection sensor that detects the operation of at least one of the prime mover 3 of the working machine 1, the working device 4 of the working machine 1, and the traveling device 5 of the working machine 1, and the boarding detector 13 determines the alighting based on the signal output from the detection sensor. This allows the operator to determine the operator's alighting based on the fact that the operator has completed the work and stopped the prime mover 3, the working device 4, and the traveling device 5 of the working machine 1.

For this reason, the system can determine the operator's alighting in a configuration that is also provided in the conventional work machine 1. In other words, the monitoring system for the working machine 1 can be easily introduced.

The detection sensor includes the sensor 13a that detects whether the operator is seated or not, and the boarding detector 13 determines the alighting based on the signal input from the sensor 13a. This enables the operator to detect the seating of the operator in the seat of the operator seat 8 provided in the working machine 1.

Thus, the presence or absence of an operator in the operator seat 8 of the working machine 1 can be easily determined. In other words, the accuracy of detecting the alighting and boarding of the operator can be improved.

The monitoring system of the working machine 1 is provided with the position detector 34 and the mobile terminal 30, the working machine 1 has the communicator 12, and the transmitter 32 of the mobile terminal 30 transmits the position information detected by the position detector 34 and the yield received by the receiver 33 to the management machine 40. This allows the monitoring system for the working machine 1 to use the mobile terminal 30, which has a position detector 34 provided in advance.

Thus, the monitoring system for the working machine 1 can be easily introduced even if the working machine 1 does not have the position detector 34. The mobile terminal 30 can also communicate with the server 50 by means of a data communication network or a cellular phone communication network. Thus, even if the communicator 12 provided in the working machine 1 supports only short-range communication, the working machine 1 can communicate with the server 50 via the mobile terminal 30. In other words, the server 50 can call the management machine 40.

The controller 44 moves the management machine 40 at every predetermined time interval or at random time intervals, based on the positional information. This also reduces the possibility that the management machine 40 will be dispatched and the time interval to be monitored is known. In other words, the possibility that the management machine 40 is not dispatched in the vicinity of the work machine and that the working machine 1 is targeted during the interval of monitoring can be reduced.

The management machine 40 is a multicopter capable of flying over the field. This allows the management machine 40 to be easily dispatched even when it is difficult to move on the ground, such as when the road surface in the field where the working machine 1 is working is rough. As a result, the management machine 40 can be dispatched regardless of the field conditions, and the possibility of the theft of the working machine 1 can be reduced in advance.

Figure 4:
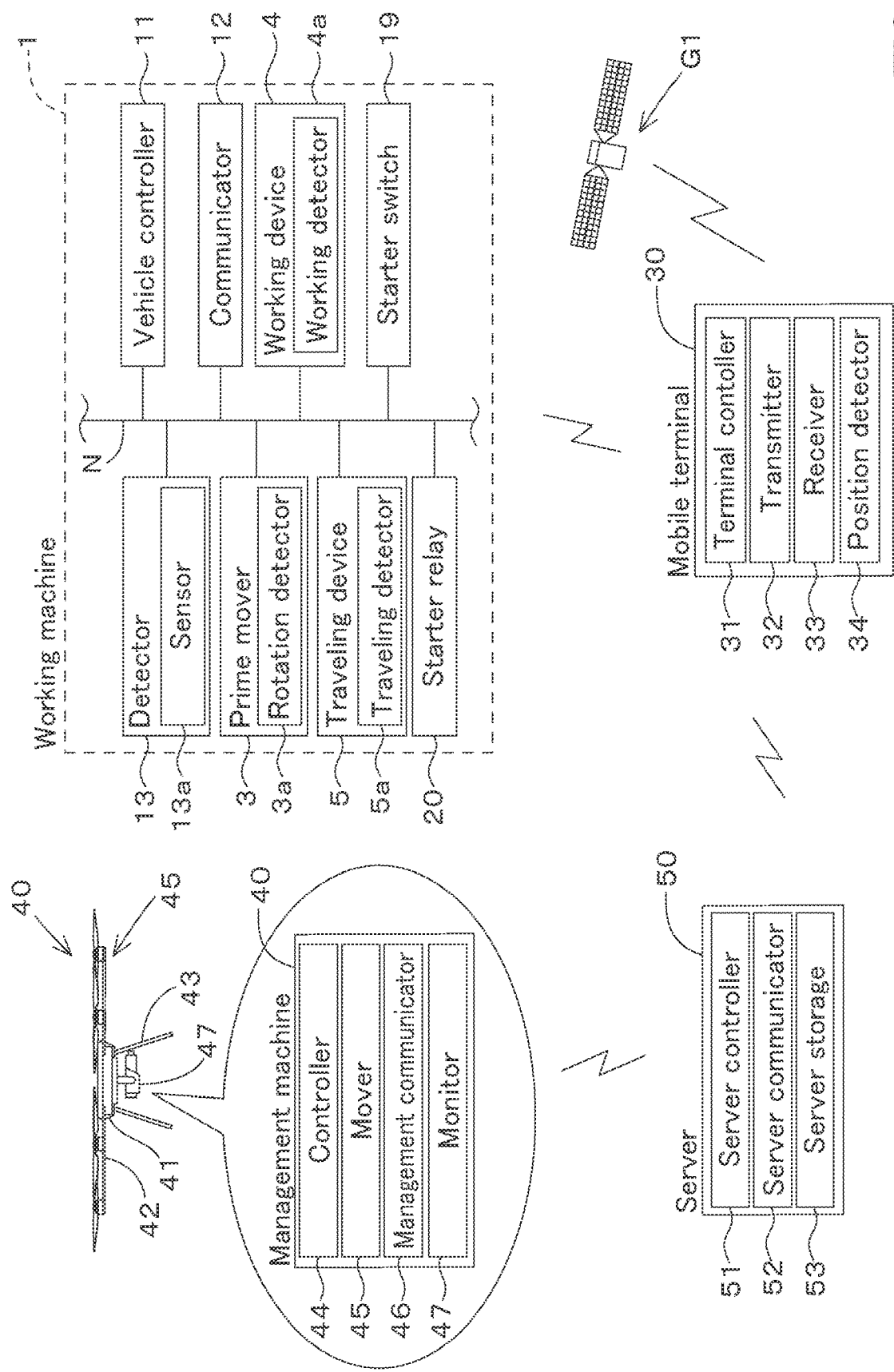
FIG. 4 is an overall view of a monitoring system for a working machine according to a modified example.

Now, in the monitoring system for the working machine 1 described above, the mobile terminal 30 calls the management machine 40, but the server 50 may also call the management machine 40, as in the monitoring system for the working machine 1 shown in FIG. 4.

The server 50 has a server controller device 51, a server communicator device 52, and a server storage 53.

The server controller device 51 includes a CPU and the like, and performs various controls relating to the server 50.

The server communication device 52 enables the server 50 to communicate wirelessly with the mobile terminal 30 and the management machine 40. The server communication device 52, for example, communicates wirelessly with the transmitter 32 and the receiver 33 of the mobile terminal 30 and the management communicator 46 of the management machine 40 by means of the IEEE 802.11 series Wi-Fi (registered trademark) or the like, which is a communication standard.

The server communication device 52 may, for example, communicate wirelessly with the transmitter 32, the receiver 33, and the management communicator 46 by means of a cellular phone communication network, a data communication network, a cellular phone communication network, or the like.

The server storage 53 is a non-volatile memory or the like, and stores various information, including information received by the server communication device 52.

The server controller device 51 can be switched between a normal mode and a monitoring mode. The normal mode is a mode in which the normal functions of the server 50 are used. The monitoring mode is a mode for calling the management machine 40 at regular intervals or randomly around the work machine. The switching between the normal mode and the monitoring mode is switched based on a server change signal received by the server communication device 52 from the transmitter 32 of the mobile terminal 30.

In particular, when the server communication device 52 receives a server change signal from the transmitter 32, the server communication device 52 switches to one of the normal mode and the monitoring mode based on the server change signal. If the server communication device 52 does not receive a server change signal from the transmitter 32, the current mode is maintained.

The server communication device 52, for example, receives a server change signal from the transmitter 32 of the mobile terminal 30. The server communication device 52 also sends a call signal to the management communicator 46. In detail, the server communication device 52 transmits a call signal to the management communicator 46 at predetermined or random time intervals.

The server communication device 52 receives the images and videos captured by the monitor 47 from the management communicator 46. This allows the working machine 1 to dispatch the management machine 40 via the mobile terminal 30 and the server 50. Thus, even if the processing power of the terminal controller 31 of the mobile terminal 30 is not very high, complex processing can be performed, such as dispatching a plurality of management machines 40.

In addition to the monitoring system for the working machine 1 of the present invention, the system can be used in conjunction with other monitoring systems possessed by the server 50. In other words, the monitoring capability of the monitoring system for the working machine 1 can be improved.

Figure 5:
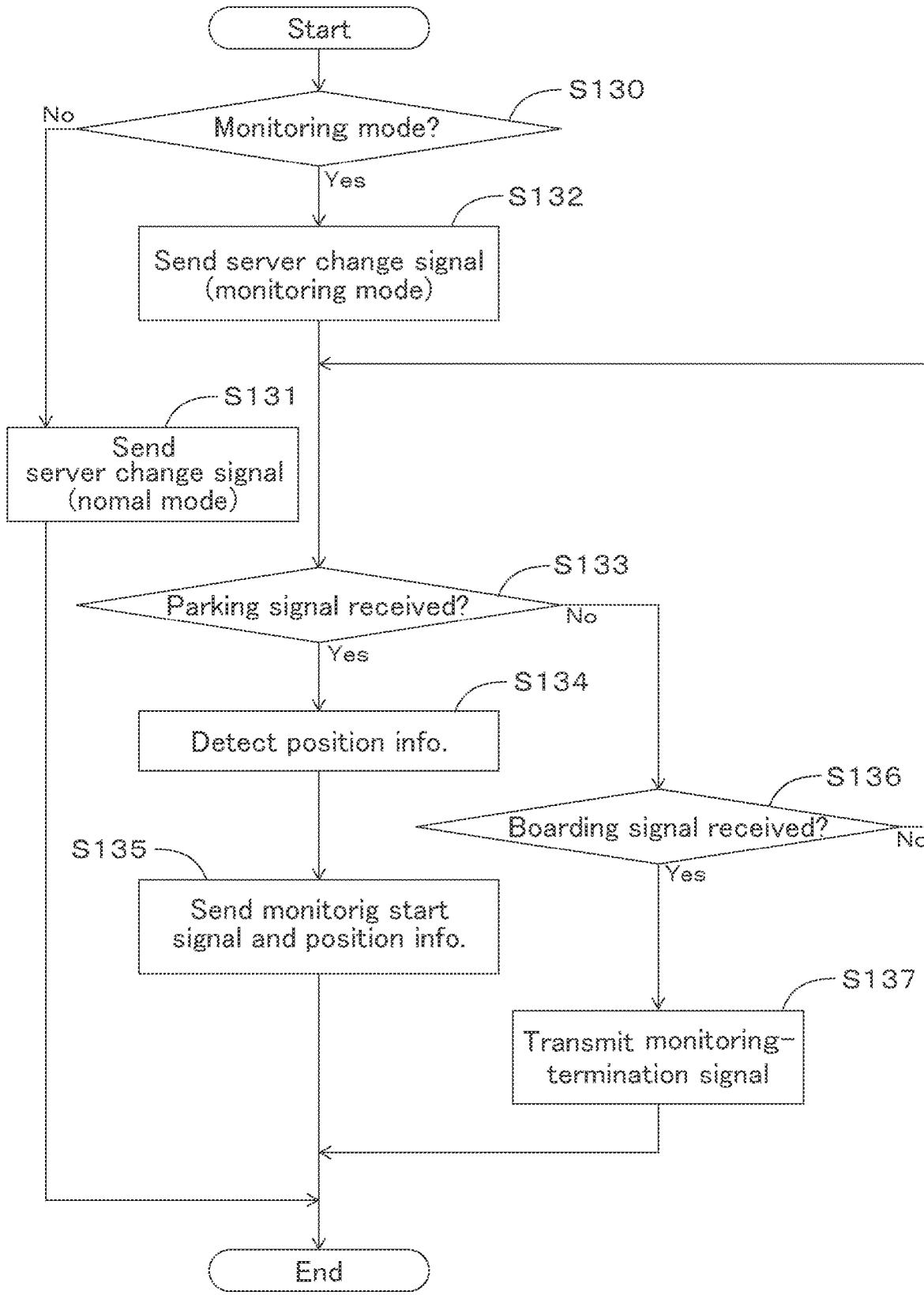
FIG. 5 is a view showing a sequential flow of the monitoring system in a mobile terminal according to the modified example.

A series of operations of the monitoring system in the working machine 1 will be described below with reference to FIG. 5.

The terminal controller 31 determines whether or not it is in the monitoring mode (step S130). In particular, the terminal controller 31 checks whether the receiver 33 receives a terminal change signal.

If a terminal change signal is received, the terminal controller 31 determines that the terminal controller 31 has been changed from one of the normal mode and the monitoring mode to the other. If the terminal change signal is not received, the terminal controller 31 maintains the current mode.

If the terminal controller 31 determines that it is not in the monitoring mode, for example, it is in the normal mode, the transmitter 32 transmits a server change signal to the server communicator device 52, which instructs it to change to the normal mode (step S131).

On the other hand, if it determines that it is in the monitoring mode, the transmitter 32 transmits a server change signal instructing the server to change to the monitoring mode (step S132).

If the terminal control device 31 determines that it is in the monitoring mode, the terminal control device 31 confirms whether the receiver 33 is receiving the parking signal (step S133).

If it is confirmed that the parking signal is received, the boarding detector device 13 detects the positional information (step S134).

In particular, the position detector 34 receives the signal transmitted from the positioning satellite G1 and detects its own position based on the received signal. In other words, the position detector 34 detects the position of the operator when the operator boards on or alters the working machine 1.

The transmitter 32 transmits a monitoring start signal to the server communication device 52 about the position detected by the boarding detector 13 (step S135).

On the other hand, if the parking signal is not received, the terminal controller 31 checks whether the receiver 33 is receiving the boarding signal (step S136).

If it is determined that the boarding signal is being received, the transmitter 32 transmits a monitoring termination signal (step S137).

In other words, the terminal controller 31 releases the monitoring at the relevant position detected by the positional information detector. In detail, when the monitoring is set for the position, the terminal controller 31 releases the setting of the monitoring by sending the monitoring termination signal to the server communication device 52.

On the other hand, the terminal controller 31 does not set the monitoring for the location by sending a monitoring termination signal to the server communication device 52 when the monitoring is not set for the location.

Figure 6:
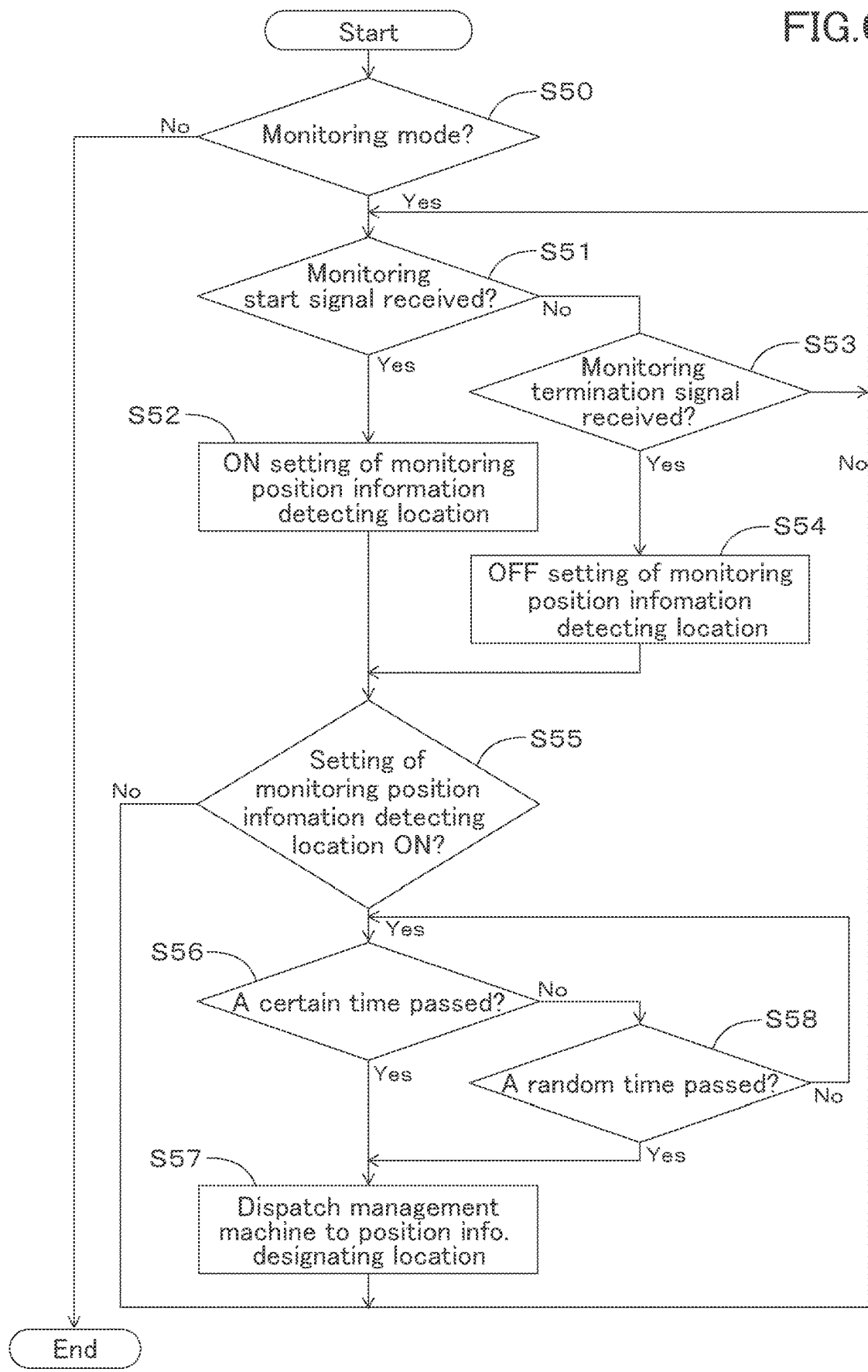
FIG. 6 is a view showing a sequential flow of the monitoring system in a server according to the modified example.

A series of operations of the monitoring system at the server 50 will be described below with reference to FIG. 6.

The server controller 51 determines whether or not it is a monitoring mode (step S50). In particular, the server controller 51 checks whether the receiver 33 receives a server change signal.

If a server change signal is received, the server controller 51 determines that the server has been changed from one of the normal mode and the monitoring mode to the other. If the server change signal is not received, the server controller device 51 maintains the current mode.

If it is determined to be a monitoring mode, the server controller 51 checks whether the server communication device 52 receives a monitoring start signal from the transmitter 32 of the mobile terminal 30 (step S51).

If the server control device 51 confirms that it has received a monitoring start signal from the transmitter 32, the server control device 51 sets the monitoring mode for the position detected by the boarding detector device 13 (step S52).

On the other hand, if the monitoring start signal has not been received, the server controller device 51 confirms whether or not a monitoring termination signal has been received from the transmitter 32 (step S53).

If it is determined that the monitoring termination signal is received, the server controller device 51 releases the monitoring at the relevant position detected by the positional information detector (step S54).

In detail, the server controller 51 sets the monitoring mode if the monitoring is set for the position. On the other hand, the server controller 51 releases the setting of the monitoring mode for the position if the monitoring is not set for the position.

The server checks whether monitoring is set up at the location where the positional information is detected (step S55).

After a certain amount of time has passed (step S56), the server 50 dispatches the management device 40 about the location where the positional information is detected (step S57). In particular, the server communication device 52 sends a call signal including the positional information detected by the position detector device 34 to the management machine 40.

In this manner, based on the call signal, the management machine 40 moves to the location. In other words, the mobile terminal 30 dispatches the management machine 40 to the vicinity of the work machine at regular intervals.

Even before a certain amount of time has passed (step S56), if a random amount of time has passed (step S58), the server 50 dispatches the management machine 40 to the location where the positional information was detected (step S57).

In particular, the server communication device 52 sends a call signal including the positional information detected by the position detector device 34 to the management machine 40. Thereby, based on the call signal, the management machine 40 moves to the location. In other words, the server 50 dispatches the management machine 40 to the vicinity of the work machine at random time intervals.

The monitoring system for the working machine 1 as described above has a server 50 that receives position information and demurrage from the transmitter 32 and transmits the position information and demurrage to the management machine 40, and the transmitter 32 of the mobile terminal 30 transmits the position information detected by the position detector 34 and the demurrage received by the receiver 33 to the management machine 40 via the server 50.

This enables the working machine 1 to dispatch the management machine 40 via the mobile terminal 30 and the server 50. Thus, even if the processing capacity of the terminal controller 31 of the mobile terminal 30 is not very high, it can perform complex processing, such as dispatching a plurality of management machines 40.

In addition to the monitoring system for the working machine 1 of the present invention, the system can be used in combination with other monitoring systems possessed by the server 50. In other words, the monitoring capability of the monitoring system for the working machine 1 can be improved.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A monitoring system for a working machine, comprising:
    a boarding detector to detect boarding and alighting of an operator, the boarding detector being provided in the working machine;
    a position detector to detect a position of the working machine based on a signal sent from a positioning satellite when the boarding detector detects the alighting of the operator, the position detector being provided in a mobile terminal belonging to the operator;
    a transmitter to transmit, to a management machine, positional information representing the position detected by the position detector, the transmitter being provided in the mobile terminal;
    a controller to, upon receipt of the positional information, dispatch the management machine to the position represented by the positional information, the controller being provided in the management machine; and
    a monitor device to monitor the working machine, the monitor device being provided in the management machine.

2. The monitoring system for the working machine according to claim 1, comprising
    a detection sensor to detect movement of at least one of a prime mover included in the working machine, a working device included in the working machine, or a traveling device included in the working machine, wherein
    the boarding detector judges the alighting upon detecting at least one of a stop of the prime mover, a stop of the working device, or a stop of the traveling device based on a signal output from the detection sensor.

3. The monitoring system for the working machine according to claim 1, wherein
    the boarding detector includes a sensor to detect whether the operator sits on and judges the alighting based on a signal output from the sensor.

4. The monitoring system for the working machine according to claim 2, wherein
    the boarding detector includes a sensor to detect whether the operator sits on and judges the alighting based on a signal output from the sensor.

5. The monitoring system for the working machine according to claim 1, comprising:
    a communicator to transmit an alighting signal indicating the alighting detected by the boarding detector, the communicator being provided in the working machine;
    a receiver to receive the alighting signal from the communicator, the receiver being provided in the mobile terminal, wherein
    the transmitter transmits, to the management machine, the positional information detected by the position detector and the alighting signal received by the receiver.

6. The monitoring system for the working machine according to claim 2, comprising:
    a communicator to transmit an alighting signal indicating the alighting detected by the boarding detector, the communicator being provided in the working machine;
    a receiver to receive the alighting signal from the communicator, the receiver being provided in the mobile terminal, wherein
    the transmitter transmits, to the management machine, the positional information detected by the position detector and the alighting signal received by the receiver.

7. The monitoring system for the working machine according to claim 3, comprising:
    a communicator to transmit an alighting signal indicating the alighting detected by the boarding detector, the communicator being provided in the working machine;
    a receiver to receive the alighting signal from the communicator, the receiver being provided in the mobile terminal, wherein
    the transmitter transmits, to the management machine, the positional information detected by the position detector and the alighting signal received by the receiver.

8. The monitoring system for the working machine according to claim 4, comprising:
    a communicator to transmit an alighting signal indicating the alighting detected by the boarding detector, the communicator being provided in the working machine;
    a receiver to receive the alighting signal from the communicator, the receiver being provided in the mobile terminal, wherein
    the transmitter transmits, to the management machine, the positional information detected by the position detector and the alighting signal received by the receiver.

9. The monitoring system for the working machine according to claim 5, comprising
    a server to receive the positional information and the alighting signal from the transmitter and to transmit the positional information and the alighting signal to the management machine, wherein the transmitter of the mobile terminal transmits the positional information detected by the position detector and the alighting signal received by the receiver to the management machine through the server.

10. The monitoring system for the working machine according to claim 6, comprising
a server to receive the positional information and the alighting signal from the transmitter and to transmit the positional information and the alighting signal to the management machine, wherein
the transmitter of the mobile terminal transmits the positional information detected by the position detector and the alighting signal received by the receiver to the management machine through the server.

11. The monitoring system for the working machine according to claim 7, comprising
a server to receive the positional information and the alighting signal from the transmitter and to transmit the positional information and the alighting signal to the management machine, wherein
the transmitter of the mobile terminal transmits the positional information detected by the position detector and the alighting signal received by the receiver to the management machine through the server.

12. The monitoring system for the working machine according to claim 8, comprising
a server to receive the positional information and the alighting signal from the transmitter and to transmit the positional information and the alighting signal to the management machine, wherein
the transmitter of the mobile terminal transmits the positional information detected by the position detector and the alighting signal received by the receiver to the management machine through the server.

13. The monitoring system for the working machine according to claim 1, wherein
the transmitter transmits the positional information to the management machine at one or more predetermined time intervals or at one or more arbitral time intervals; and
the controller dispatches the management machine to the position represented by the positional information according to the one or more time intervals at which the controller received the positional information.

14. The monitoring system for the working machine according to claim 2, wherein
the transmitter transmits the positional information to the management machine at one or more predetermined time intervals or at one or more arbitral time intervals; and
the controller dispatches the management machine to the position represented by the positional information according to the one or more time intervals at which the controller received the positional information.

15. The monitoring system for the working machine according to claim 3, wherein
the transmitter transmits the positional information to the management machine at one or more predetermined time intervals or at one or more arbitral time intervals; and
the controller dispatches the management machine to the position represented by the positional information according to the one or more time intervals at which the controller received the positional information.

16. The monitoring system for the working machine according to claim 4, wherein
the transmitter transmits the positional information to the management machine at one or more predetermined time intervals or at one or more arbitral time intervals; and
the controller dispatches the management machine to the position represented by the positional information according to the one or more time intervals at which the controlled received the positional information.

17. The monitoring system for the working machine according to claim 1, wherein
the management machine is a multicopter to fly over an agricultural field and is controlled by the controller to fly to be dispatched to the position represented by the positional information.

18. The monitoring system for the working machine according to claim 2, wherein
the management machine is a multicopter to fly over an agricultural field and is controlled by the controller to fly to be dispatched to the position represented by the positional information.

19. The monitoring system for the working machine according to claim 3, wherein
the management machine is a multicopter to fly over an agricultural field and is controlled by the controller to fly to be dispatched to the position represented by the positional information.

20. The monitoring system for the working machine according to claim 4, wherein
the management machine is a multicopter to fly over an agricultural field and is controlled by the controller to fly to be dispatched to the position represented by the positional information.

* * * * *